United States Patent Office 2,790,804
Patented Apr. 30, 1957

2,790,804

CATALYTIC HYDROGENATION

Gerald Alfred Silverstone, Manchester, England, assignor to Imperial Chemical Industries Limited, London, England, a corporation of Great Britain No Drawing. Application May 27, 1955,
Serial No. 511,767

Claims priority, application Great Britain June 4, 1955

5 Claims. (Cl. 260—293.2)

This invention relates to the catalytic hydrogenation of glutaronitrile.

It has already been proposed to reduce glutaronitrile with hydrogen, in the presence of a hydrogenation catalyst, in order to obtain piperidine and/or pentamethylene diamine. In these prior art processes however the yield of piperidine is always low.

We have now found that the yield of piperidine can be substantially increased by conducting the reaction at elevated temperatures and for prolonged contact time, whereby initially formed pentamethylenediamine is transformed to piperidine.

Thus according to the present invention, in the process for the catalytic hydrogenation of glutaronitrile to piperidine, we provide the improvement which comprises conducting the reaction at elevated temperature and for prolonged contact time whereby initially formed pentamethylene diamine is transformed to piperidine.

The catalytic hydrogenation of glutaronitrile according to the process of this invention is conveniently performed by heating the glutaronitrile under a pressure of from about 1000 to about 4000 pounds per square inch of hydrogen in the presence of a hydrogenation catalyst such as cobalt on kieselguhr or Raney nickel, and also, advantageously, in the presence of ammonia. Suitable amounts of the catalyst are from about 0.05 to about 0.5 part by weight for each part of glutaronitrile. Suitable amounts of ammonia are from about 1 to about 10 parts by weight for each part of glutaronitrile. If desired, a solvent such as methanol may be used.

As said, in the process of this invention the reaction is conducted at elevated temperatures and heating at these temperatures is continued so as to transform pentamethylenediamine to piperidine. The yield of piperidine depends upon the temperature and time of contact, as shown in the table below.

Suitable temperatures are from 130° to 220° C. and preferably at least 150° C. Suitable contact times are between one hour and 18 hours and preferably at least 3 hours.

At low temperatures or shorter contact times, conversion of glutaronitrile to pentamethylene diamine and piperidine proceeds to the same extent, but the proportion of piperidine is smaller.

The invention is illustrated but not limited by the following example in which parts and percentages are by weight.

*Example*

A mixture of 75 parts of glutaronitrile, 10 parts of a catalyst consisting of cobalt metal deposited on kieselguhr and 75 parts of anhydrous ammonia is stirred in an autoclave at 171° C. under a pressure of hydrogen at 3778 lbs./sq. in. for 6 hours.

After cooling of the autocalve and release of residual pressure the contents of the autoclave are washed with methanol and fractionated by distillation through a packed column. When all methanol has been removed liquid fractions are collected at the boiling point range.

(1) 67–90° C.
(2) 90–103° C.
(3) 103–108° C.
(4) 106–174° C. (small intermediate fraction—rejected)
(5) 174–178° C.

Fraction 1 is found to contain 40% of piperidine, fraction 2 80% and fraction 3 97.5% of piperidine, the total yield being 50.4 parts (74.3% of that possible by theory). Fraction 5 consists of 9.1 parts of pentamethylene diamine (representing a yield of 11.2% of that possible by theory). This pentamethylene diamine can itself be converted into piperidine by cyclisation and accordingly the total yield of useful hydrogenation products amounts to 81.8% of that theoretically possible.

The following table shows the yields of piperidine and also of pentamethylenediamine that are obtained when the above example is repeated using different reaction conditions, as listed in the table.

| Parts of Nitrite | Parts of NH₃ | Catalyst | Parts of catalyst | Temp., °C. | Max. pressure (lb./sq. in.) (gauge) | Time, hours | Yield of piperidine | | Yield of pentamethylene diamine | |
|---|---|---|---|---|---|---|---|---|---|---|
| | | | | | | | Parts | Percent | Parts | Percent |
| 75 | 75 | Cobalt on kieselguhr | 10 | 170 | 3,675 | 12 | 56.25 | 82.9 | | |
| 75 | 75 | do | 10 | 170 | 3,557 | 3 | 47.39 | 69.9 | 9.1 | 11.2 |
| 75 | 75 | do | 10 | 171 | 3,778 | 6 | 50.4 | 74.3 | 6.1 | 7.5 |
| 75 | 100 | do | 10 | 142 | 3,499 | 12 | 37.3 | 68.8 | 10.4 | 16 |
| 60 | 75 | Raney Nickel | 10 | 172 | 2,940 | 14 | 56.47 | 83.3 | | |
| 75 | 200 | Cobalt on alumina | 8 | 125 | 3,425 | 12 | 21.9 | 40.3 | 27 | 41.5 |
| 60+methanol (12 parts) | 250 | Cobalt on kieselguhr | 12 | 125 | 3,146 | 12 | 21.8 | 40.1 | 26.75 | 41.1 |
| 75 | 75 | do | 10 | 200 | 3,410 | 2 | 56.1 | 82.7 | | |

What I claim is:

1. Improvement in a process for the catalytic hydrogenation of glutaronitrile to piperidine which comprises conducting the reaction at elevated temperature and in the presence of ammonia and for prolonged contact time whereby initially formed pentamethylene diamine is transformed to piperidine.

2. In a process for the catalytic hydrogenation of glutaronitrile to piperidine as claimed in claim 1 the improvement wherein the glutaronitrile is heated under a pressure of from about 1000 to about 4000 pounds per square inch of hydrogen in the presence of a hydrogenation catalyst selected from the group consisting of cobalt on kieselguhr or Raney nickel, and in the presence of ammonia.

3. In a process for the catalytic hydrogenation of glutaronitrile to piperidine as claimed in claim 2 the improvement wherein the amount of catalyst used is from about 0.05 to about 0.5 part by weight for each part of glutaronitrile and the amount of ammonia used is from about 1 to about 10 parts by weight for each part of glutaronitrile.

4. In a process for the catalytic hydrogenation of glutaronitrile to piperidine as claimed in claim 2, the improvement wherein the reaction is conducted at a temperature from 130° to 220° C.

5. In a process for the catalytic hydrogenation of glutaronitrile to piperidine as claimed in claim 2, the improvement wherein the contact time is between one and 18 hours.

References Cited in the file of this patent

UNITED STATES PATENTS

| | | |
|---|---|---|
| 2,166,151 | Hawk | July 18, 1939 |
| 2,166,183 | Signaigo | July 18, 1939 |
| 2,200,282 | Lazier | May 14, 1940 |
| 2,232,598 | Farlow | Feb. 18, 1941 |

FOREIGN PATENTS

| | | |
|---|---|---|
| 526,497 | Great Britain | Sept. 19, 1940 |

OTHER REFERENCES

Henecka: Chem. Ber., 82, 104 (1949).